US007963701B2

(12) United States Patent
Gebhart

(10) Patent No.: US 7,963,701 B2
(45) Date of Patent: Jun. 21, 2011

(54) SYSTEM AND METHOD FOR SETTING ROLLER SKEW

(75) Inventor: Walter M. Gebhart, South Sioux City, NE (US)

(73) Assignee: Phillips Kiln Services, Ltd., South Sioux City, NE (US)

( * ) Notice: Subject to any disclaimer, the term of this patent is extended or adjusted under 35 U.S.C. 154(b) by 425 days.

(21) Appl. No.: 12/254,447

(22) Filed: Oct. 20, 2008

(65) Prior Publication Data

US 2010/0098363 A1 Apr. 22, 2010

(51) Int. Cl.
*F16C 32/00* (2006.01)
*G01L 5/12* (2006.01)

(52) U.S. Cl. ............. 384/549; 384/488; 73/862.49

(58) Field of Classification Search ............ 384/448, 384/549; 73/862.49
See application file for complete search history.

(56) References Cited

U.S. PATENT DOCUMENTS

| | | | |
|---|---|---|---|
| 3,188,155 A | 6/1965 | Kemnitz | |
| 3,517,915 A | 6/1970 | Deynat | |
| 4,129,036 A | 12/1978 | Bliemeister | 73/140 |
| 4,161,877 A | 7/1979 | Bauer et al. | 73/140 |
| 4,337,929 A | 7/1982 | Evans | 266/248 |
| 4,419,901 A | 12/1983 | Ruppert et al. | 73/862.49 |
| 4,533,319 A | 8/1985 | Mathews et al. | |
| 4,578,871 A | 4/1986 | Kathel | 33/304 |
| 5,146,795 A | 9/1992 | Gebhart | 73/865.9 |
| 5,148,238 A | 9/1992 | Gebhart | 356/375 |
| 5,219,379 A | 6/1993 | Good et al. | 33/642 |
| 5,305,533 A | 4/1994 | Alexander et al. | 34/549 |
| 5,491,553 A | 2/1996 | Gebhart | 356/375 |
| 5,613,782 A | 3/1997 | Korting et al. | |
| 6,105,439 A | 8/2000 | Roger | 73/862.49 |
| 6,164,117 A | 12/2000 | Passwater et al. | |
| 6,289,748 B1 | 9/2001 | Sanders | 73/862.49 |
| 6,460,423 B1 | 10/2002 | Keller et al. | 73/862.49 |
| 6,644,859 B2 | 11/2003 | Körting | 384/549 |
| 6,792,382 B2 | 9/2004 | Kunitomo | |
| 6,920,801 B2 | 7/2005 | Van Leeuwen et al. | 73/862.49 |
| 6,934,629 B1 | 8/2005 | Chisholm et al. | |
| 7,107,168 B2 | 9/2006 | Oystol et al. | 702/94 |
| 2007/0266798 A1 | 11/2007 | Gebhart | 73/862 |

FOREIGN PATENT DOCUMENTS

| | | |
|---|---|---|
| JP | 54-7965 | 1/1979 |
| JP | 1990-6996 | 1/1990 |
| JP | 07-218141 | 8/1995 |
| JP | 2002-054914 | 2/2002 |

OTHER PUBLICATIONS

"EL MonoPod Tiltmenter" Manual, Slope indicator Company, 2003. (11 pages).
"El Tiltmeter Standard & SC Versions", Slope Indicator Company, 2003. (18 pages).
"EL Monopod Tiltmeter" Brochure, Slope Indicator Company, p. 61-62, 2003. (2 pages).
"ELTiltmeters", http://www.slopeindicator.com/instruments/tilt-eltiltmeter.html, Nov. 1, 2004. (2 pages).

*Primary Examiner* — Thomas R Hannon
(74) *Attorney, Agent, or Firm* — Westman, Champlin & Kelly, P.A.

(57) ABSTRACT

A system and method for reducing roller skew, which involve ascertaining first and second thrust load properties applied to a roller while a rotary body rotates in opposing rotational directions, and adjusting an orientation of at least one bearing assembly for the roller until an amplitude difference between the first and second thrust load properties is below a predetermined threshold.

20 Claims, 8 Drawing Sheets

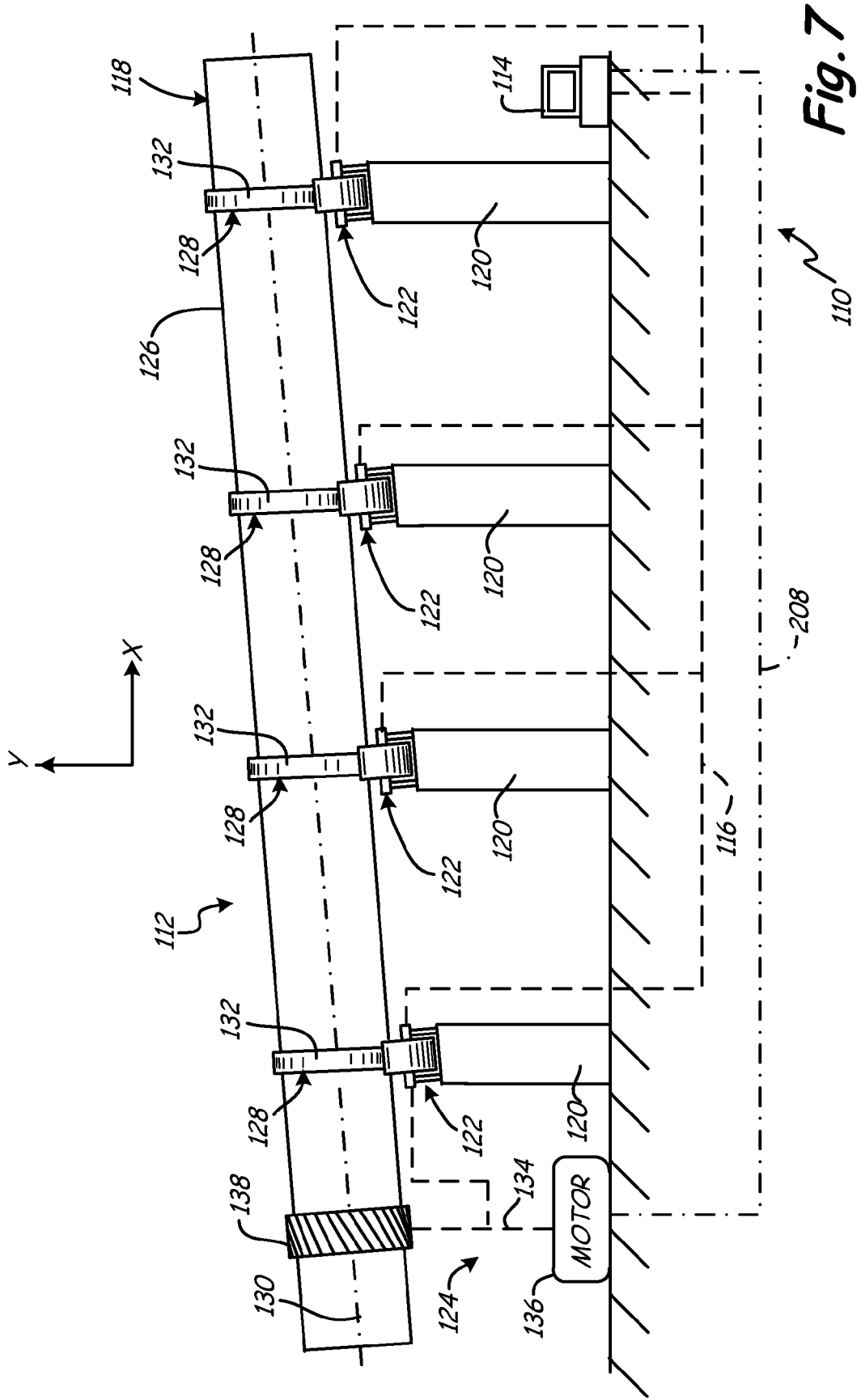

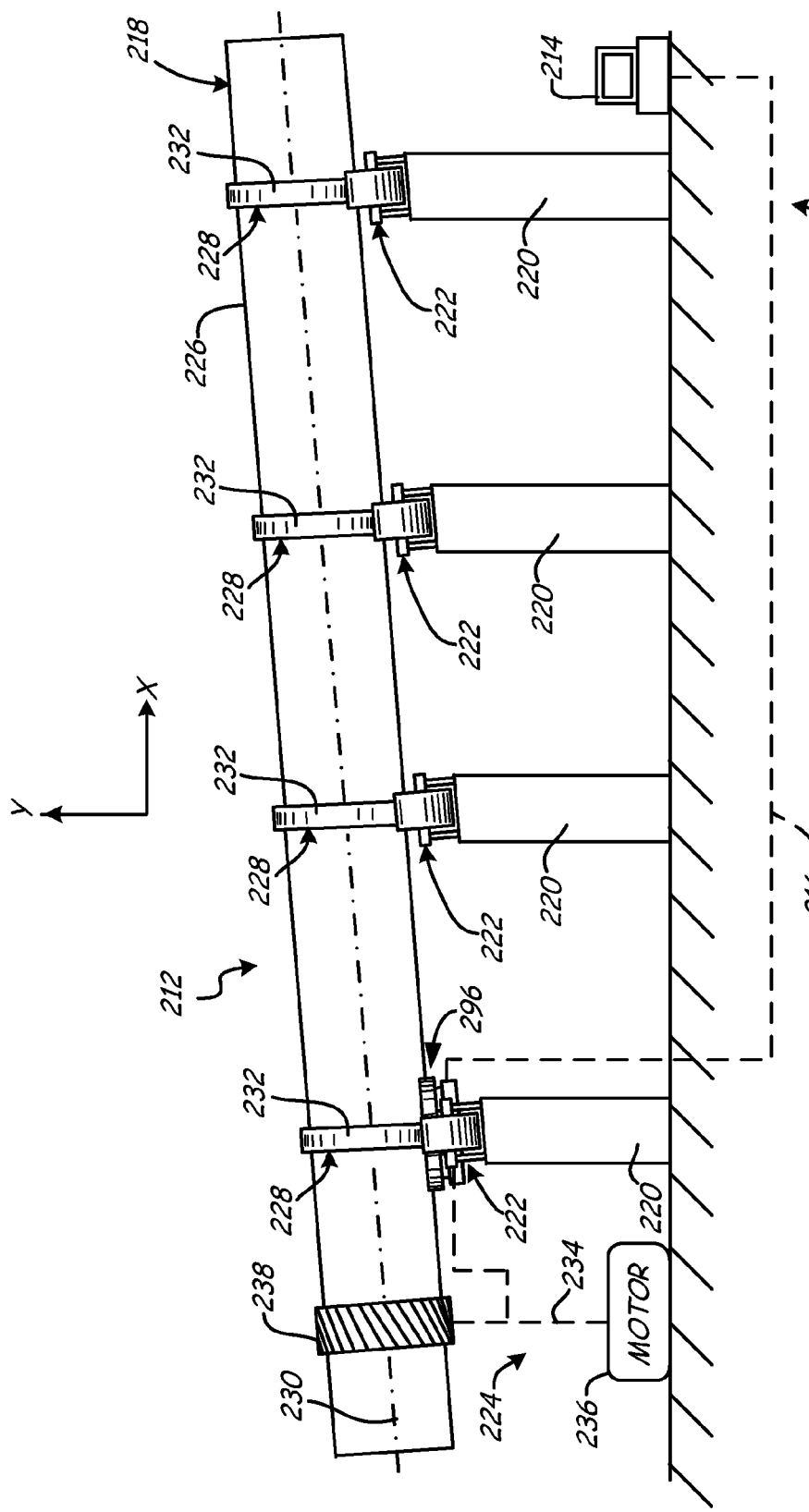

SYSTEM AND METHOD FOR SETTING ROLLER SKEW

BACKGROUND

The present disclosure relates to the operation of rotary bodies, such as rotary kilns. In particular, the present disclosure relates a system and method for identifying the neutral roller skew position, and for setting the skew for rollers used to support rotary bodies.

Cylindrical rotary bodies, such as rotary kilns, are used in carrying out a large number of economically important processes. Such bodies typically includes a cylindrical shell portion that is supported by annular tyres spaced along the length of the tube. Each tyre is carried on a pair of opposed rollers, which in turn may be mounted upon a concrete pier or pad. The shell portion is rotated about its longitudinal axis, and is supported for such rotation by contact of the rollers with the tyres surrounding the shell portion. The rollers are correspondingly supported upon the piers or pads with the use of bearing assemblies.

Over extended periods of operation, the rollers may fall out of alignment, thereby causing their rotational axes to move out of parallel with respect to each other and not parallel or otherwise in optimum position with respect to the rotational axis of the shell. This is typically referred to as roller skew. The cost of replacing the tyres and/or rollers is relatively high. Thus, an important consideration in the operation of such rotary equipment is the maintenance of proper alignment between the surface of a roller and the supporting tyre to prevent uneven wearing of the respective surfaces and overloading the bearing assemblies. If the two are kept in proper alignment, a long life can be expected from the tyre and the rollers and the bearing assemblies.

Alignment relationships are complicated by the fact that such rotary equipment is typically constructed with the shell portion on a slight slope relative to horizontal to facilitate the flow of material therethrough. Thus, the shell exerts an axial force due to gravity, thereby causing an axial thrust load to exist on the rollers and their associated bearing assemblies whenever they are required to counteract gravity to keep the shell running on the rollers. In order to maintain proper alignment between the shell portion and the rollers, it has previously been necessary to periodically check the alignment by visual inspection or by sophisticated alignment measurements, to determine roller axial position as best possible. However, such measurements typically do not provide sufficient accuracies, must be made relatively often, are difficult to evaluate, very subjective, and in many instances are not dependably carried out by the operator.

SUMMARY

An aspect of the present disclosure is directed to a method for reducing roller skew for a plurality of rollers configured to support a rotary body. The method includes ascertaining a first thrust load property applied to a first roller of the plurality of rollers from the rotary body while the rotary body rotates in a first rotational direction, and ascertaining a second thrust load property applied to the first roller from the rotary body while the rotary body rotates in a second rotational direction that is opposite of the first rotational direction. The method further includes adjusting an orientation of at least one bearing assembly for the first roller until an amplitude difference between the first thrust load property and the second thrust load property is below a predetermined threshold.

Another aspect of the disclosure is directed to a method for reducing roller skew for a plurality of rollers configured to support a rotary body, where the method includes (a) rotating a rotary body in a first rotational direction, which places a first thrust load on a first roller of the plurality of rollers, and (b) switching the rotational direction of the rotary body from the first rotational direction to a second and opposing rotational direction, which places a second thrust load on the first roller. The method further includes (c) adjusting an orientation of at least one bearing assembly for the first roller to reduce a difference in amplitude between the first thrust load and the second thrust load; and (d) repeating step (a), step (b), step (c), or combinations thereof until the difference in the amplitude is zero, near zero or below a predetermined threshold.

A further aspect of the disclosure is directed to a system for reducing roller skew for a plurality of rollers configured to support a rotary body. The system includes at least one sensor securable to a bearing assembly of a first roller of the plurality of rollers, where the at least one sensor is configured to measure a property corresponding to a thrust load applied to the first roller from the rotary body. The system further includes a computer-based system in signal communication with the at least one sensor, and configured to monitor the property measured by the at least one sensor while the rotary body rotates in a first rotational direction and in a second rotational direction that is opposite of the first rotational direction.

BRIEF DESCRIPTION OF THE DRAWINGS

FIG. 7 is a side schematic illustration of an alternative monitoring system of the present disclosure in use with a rotary kiln, where the alternative monitoring system is configured to adjust orientations of bearing assemblies in an automated manner.

FIG. 8 is a side schematic illustration of a second alternative monitoring system of the present disclosure in use with a rotary kiln having one or more thrust roller mechanisms While the above-identified figures set forth one or more embodiments of the present invention, other embodiments are also contemplated, as noted in the disclosure. In all cases, this disclosure presents the invention by way of representation and not limitation. It should be understood that numerous other modifications and embodiments can be devised by those skilled in the art which fall within the scope and spirit of the principles of this invention.

DETAILED DESCRIPTION

Figure 1:
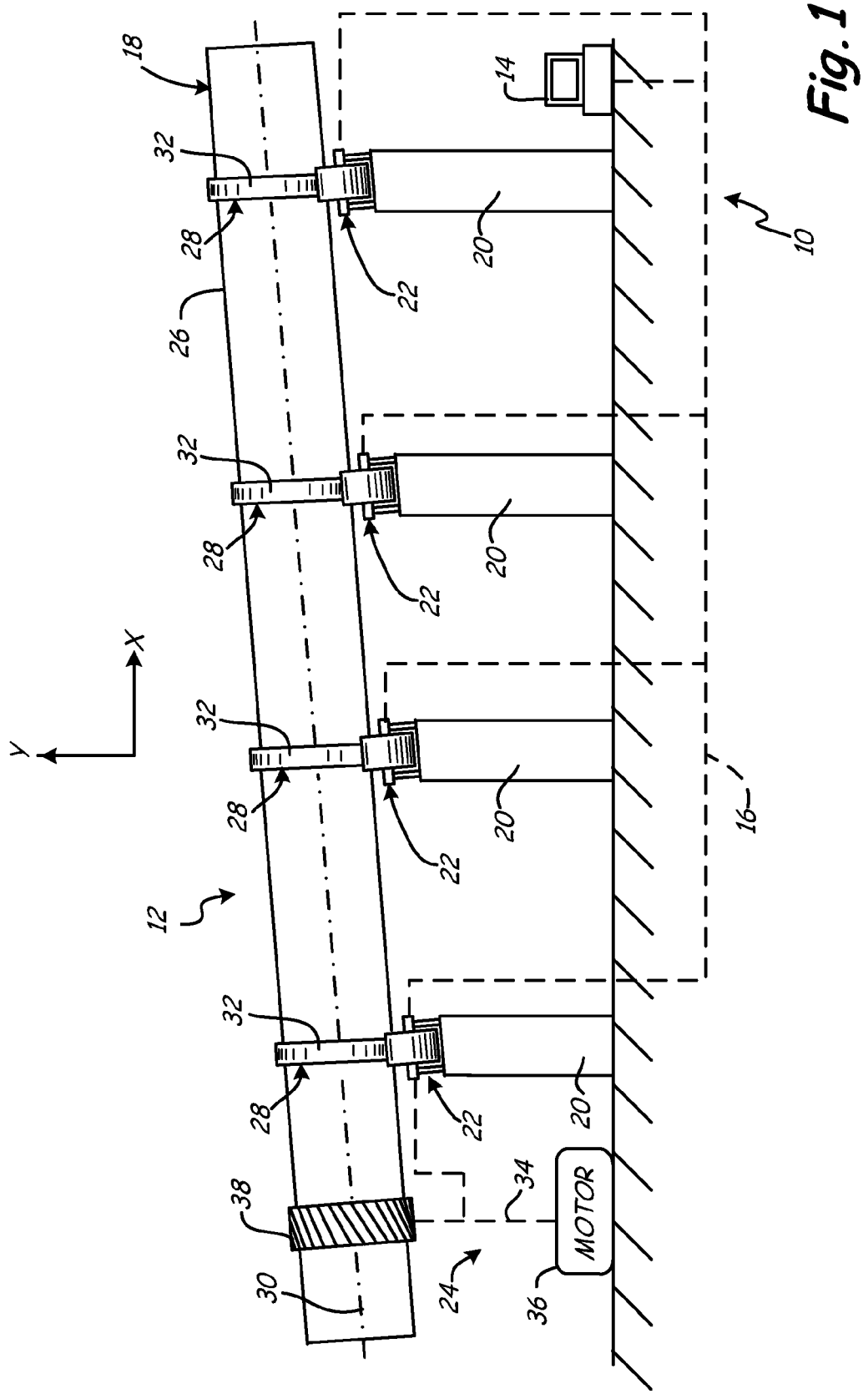
FIG. 1 is a side schematic illustration of a monitoring system of the present disclosure in use with a rotary kiln.
Figure 2:
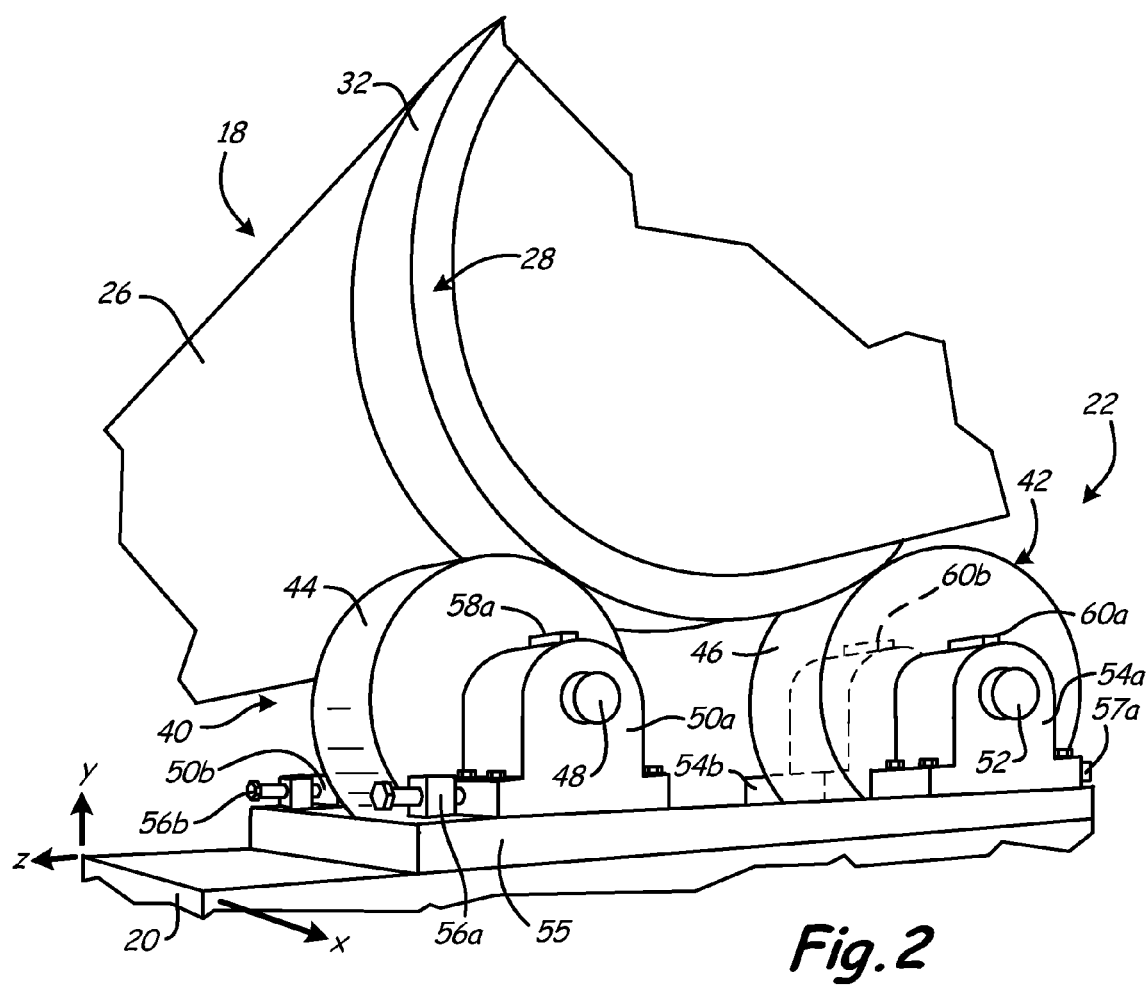
FIG. 2 is a partial front perspective view of a roller mechanism of the kiln in use with a rotary drum of the rotary kiln.

FIGS. 1 and 2 illustrate monitoring system 10 in use with kiln 12, where monitoring system 10 is configured to monitor thrust load properties of kiln 12 for identifying roller skew. As shown in FIG. 1, monitoring system 10 includes computer system 14 and communication lines 16, where computer system 14 monitors thrust load properties detected by a plurality of sensors (not shown in FIG. 1) secured to kiln 12, via communication lines 16. Communication lines 16 are physical and/or wireless signal lines that interconnect computer system 14 and the plurality of sensors. For example, communication lines 16 may include physical signal lines that interconnect computer system 14 and the plurality of sensors. Alternatively, communication lines 16 may be wireless transmitters and receivers between computer system 14 and each of the plurality of sensors.

Kiln 12 includes rotary drum 18, piers 20, roller mechanisms 22, and drive mechanism 24. Rotary drum 18 is a rotary body that includes shell 26 and tyres 28, where shell 26 is a cylindrical shell that extends along longitudinal axis 30. Tyres 28 are rings extending around shell 26 to provide bearing surfaces 32 that are substantially coaxial to longitudinal axis 30. Piers 20 are a plurality of successive foundations, which allow rotary drum 14 to be mounted at an angle from horizontal. This allows material that is fed into the uphill end of shell 26 to flow downhill under the force of gravity while shell 26 rotates. In alternative embodiments, piers 20 may provide different angled orientations for shell 22, including a horizontal orientation. Roller mechanisms 22 are roller/bearing assembly mechanisms that are supported by piers 20, and engage bearing surfaces 32 of tyres 28, thereby rotatably supporting rotary drum 18. Examples of suitable arrangements for kiln 12 are disclosed in Gebhart, U.S. Patent Application Publication No. 2007/0266798. Furthermore, one or more of tyres 28 may engage with thrust rollers (not shown) bearing against the downstream or upstream sides of tyres 28. The thrust rollers are beneficial for preventing rotary drum 18 from slipping off of roller mechanisms 22 during operation.

In the embodiment shown in FIG. 1, drive mechanism 24 includes gear train 34 and motor 36, where gear train 34 includes one or more gear and shaft assemblies that interconnect motor 36 with one or more roller mechanisms 22. This allows rotary drum 18 to rotate under power applied from motor 36. Motor 36 may be secured to a mounting structure (not shown), and may include a variety of different motors, such as variable-frequency electric motors, hydraulic motors, electric motors containing reversing switches, motors containing reversible leads, and combinations thereof. In an alternative embodiment, girth gear 38 may extend around shell 26 and engage with gear train 34, thereby allowing motor 34 to rotate rotary drum 18 without directly engaging a roller mechanism 22. In an additional alternative embodiment, a girth gear may be absent and rotary drum 18 may be driven through the supporting rollers by way of the rollers themselves having motors mounted to their shafts.

In either embodiment, the motor used to rotate rotary drum 18 (e.g., motor 36) is desirably configured to rotate rotary drum 18 in opposing rotational directions (i.e., clockwise and counter-clockwise directions about longitudinal axis 30). This allows monitoring system 10 to monitor kiln 12 while rotary drum 18 rotates in each of the opposing rotational directions. As discussed below, monitoring system 10 is suitable for monitoring ascertainable properties relating to thrust loads (referred to as "thrust load properties") that rotary drum 18 applies to roller mechanisms 22 during operation. For example, the thrust load properties that monitoring system 10 monitors may include the amount that each bearing assembly of roller mechanism 22 "tilts" due to the applied thrust loads. The orientations of the bearing assemblies may be adjusted based on the thrust load properties that are ascertained while rotating rotary drum 18 in each rotational direction. This reduces or substantially eliminates roller skew, which increases operational efficiencies and preserves the operational life of kiln 12. Furthermore, rotary drum 18 may be operated without the use of oil, which is otherwise typically disposed between bearing surfaces 32 and roller mechanisms 22. This creates an observable trait, where the bearing surfaces become smooth and polished to provide aesthetically pleasant, shiny bearing surfaces.

The following discussion of the operation of monitoring system 10 and kiln 12 focuses on the embodiment in which monitoring system 10 monitors the amount that each bearing assembly of roller mechanism 22 tilts due to the applied thrust loads. However, monitoring system 10 is also suitable for monitoring a variety of different thrust load properties in a similar manner. For example, monitoring system 10 may include strain gauges configured to monitor the flexing of one or more components of roller mechanism 22 (e.g., rollers and/or bearing assemblies) due to the applied thrust loads from rotary drum 18. In another alternative embodiment, monitoring system 10 may include accelerometers configured to monitor the movement of one or more stationary components of roller mechanism 22 due to the applied thrust loads from rotary drum 18. Furthermore, a combination of different thrust load properties (e.g., tilt, flexing, and movement) may be monitored and ascertained.

As shown in FIG. 2, each roller mechanism 22 includes rollers 40 and 42, which respectively include bearing surfaces 44 and 46. Bearing surfaces 44 and 46 are the surfaces that engage with bearing surface 32 of tyre 28 for supporting rotary drum 18. Roller mechanism 22 also includes shaft extension 48 and bearing assemblies 50a and 50b, where shaft extension 48 axially connects roller 40 to bearing assemblies 50a and 50b. Bearing assemblies 50a and 50b are upstream and downstream bearing assemblies for roller 40, respectively, where "upstream" and "downstream" orientations are relative to the direction of material flow through rotary drum 18. Similarly, roller mechanism 22 includes shaft extension 52 and bearing assemblies 54a and 54b, where shaft extension 52 axially connects roller 42 to bearing assemblies 54a and 54b, and where bearing assemblies 54a and 54b are respectively upstream and downstream bearing assemblies for roller 42. Bearing assemblies 50a, 50b, 54a, and 54b may constitute a variety of different bearing assemblies, such as sleeve bearings, antifriction bearings, journal bearings, spherical roller bearings, and combinations thereof.

Bearing assemblies 50a, 50b, 54a, and 54b are secured to base 55, which is correspondingly secured to pier 20. While bearing assemblies 50a, 50b, 54a, and 54b are fixed to base 55, they are capable of skew adjustments by means of adjusting screws, such as adjusting screw 56a for bearing assembly 50a, adjusting screw 56b for bearing assembly 50b, adjusting screw 57a for bearing assembly 54a, and adjusting screw 57b (not shown) for bearing assembly 54b. The adjusting screws allow for skew adjustments of the axis of each of rollers 40 and 42 with respect to the axis of tyre 28 (i.e., longitudinal axis 30), which correspondingly allows a user to manually reduce the roller skew for rollers 40 and 42.

As further shown, sensors 58a and 60a are respectively secured to bearing assemblies 50a and 54a. Corresponding sensor 58b (shown in FIG. 3) and sensor 60b (shown with hidden lines) are respectively secured to bearing assemblies 50b and 54b. In the embodiment shown, sensors 58a, 58b, 60a, and 60b are tilt meters configured to detect the amount that bearing assemblies 50a, 50b, 54a, and 54b tilt due to the thrust loads that are applied from rotary drum 18. Sensors 58a, 58b, 60a, and 60b are also configured to transmit signals relating to the detected tilt amounts to computer system 14 via communication lines 16, as discussed above. Suitable tilt meters for use with monitoring system 10 include those capable of measure tilts over range of about −40 arc-minutes to about +40 arc-minutes, with tilt-detection sensitivities as small as about one arc-second (about 0.0028 degrees). Examples of suitable tilt meters include electrolytic tilt sensors and inclinometers commercially available from Spectron Glass and Electronics Incorporated, Hauppauge, N.Y.

As discussed above, in alternative embodiments, sensors 58a, 58b, 60a, and 60b may be configured to detect different "thrust load properties" (e.g., flexing and movement). In these embodiments sensors 58a, 58b, 60a, and 60b are also configured to transmit signals relating to the detected thrust load properties to computer system 14 via communication lines 16, as discussed above. In alternative embodiments, as discussed below, the sensors (e.g., sensors 58a, 58b, 60a, and 60b) may be secured to one or more thrust rollers (not shown) for detecting the magnitude of pressures applied to the one or more thrust rollers.

Figure 3:
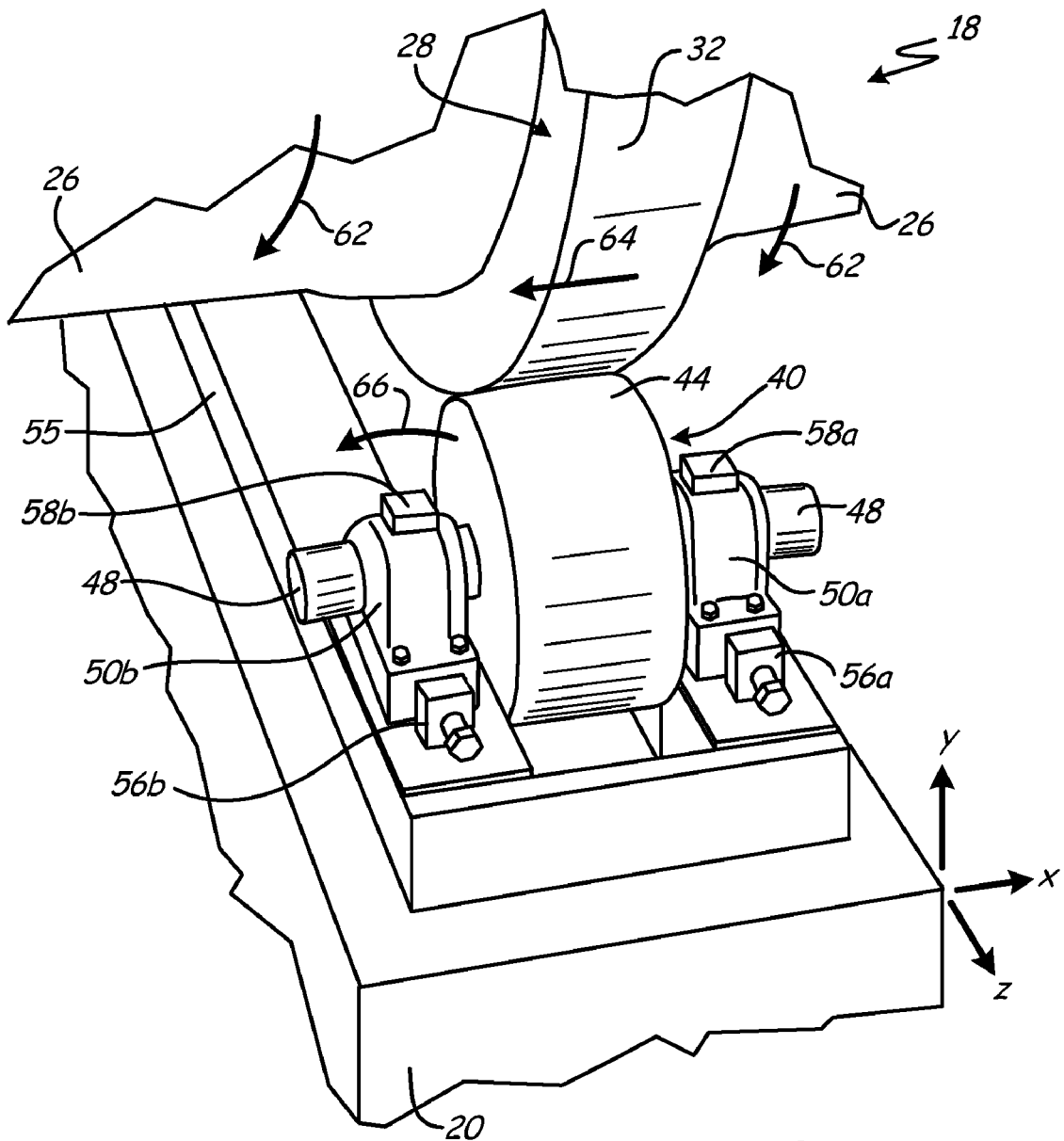
FIG. 3 is an expanded side perspective view of the roller mechanism in use with the rotary drum, where the rotary drum is rotating in a first rotational direction.
Figure 4:
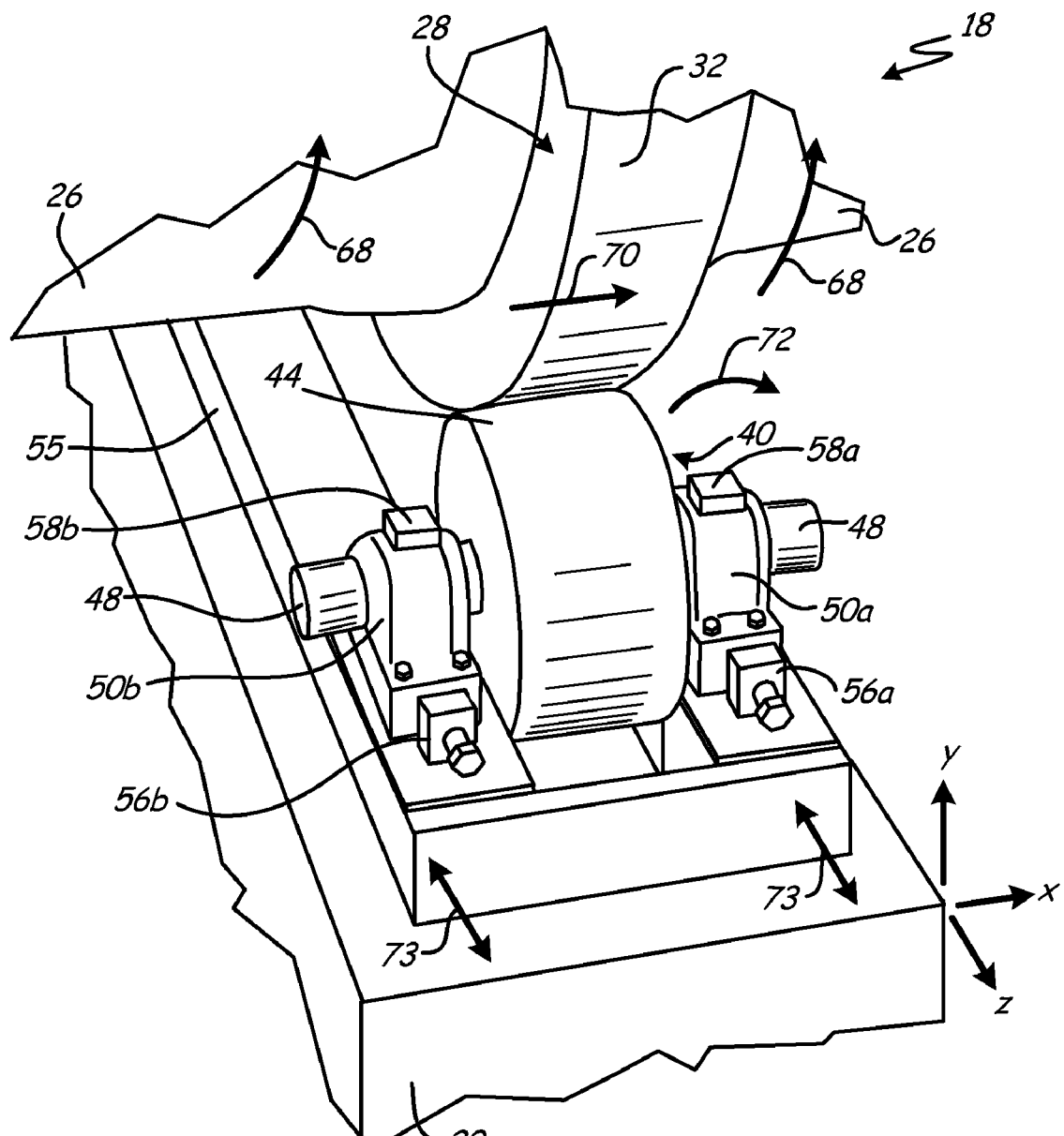
FIG. 4 is an expanded side perspective view of the roller mechanism in use with the rotary drum, where the rotary drum is rotating in a second rotational direction that is opposite of the first rotational direction.

FIGS. 3 and 4 illustrate the thrust loads applied to bearing assemblies 50a, 50b, 54a, and 54b while rotary drum 18 rotates in the opposing rotational directions. As discussed above, monitoring system 10 is suitable for monitoring the amount that bearing assemblies 50a, 50b, 54a, and 54b tilt due to the thrust loads applied from rotary drum 18 while rotating in opposing rotational directions. The orientations of bearing assemblies 50a, 50b, 54a, and 54b may then be adjusted with the use of adjustment screws 56a, 56b, 57a, and 57b to reduce or substantially eliminate roller skew by aligning the rotational axes of rollers 40 and 42 parallel to the rotational axis of rotary drum 18 (i.e., longitudinal axis 30) (i.e., optimize roller skew).

When the axes of rollers 40 and 42 are not parallel to the axis of rotary drum 18, thrust loads are induced on one or more of bearing assemblies 50a, 50b, 54a, and 54b. The induced thrust load(s) can lead to severe surface wear of the faces in rolling contact and can create enough axial force to cause bearing failure. Knowing the presence of thrust load is an important part of setting bearing assemblies 50a, 50b, 54a, and 54b for proper alignment, and also for preventing bearing failure over the long term.

As shown in FIG. 3, rotary drum 18 is rotated (via motor 36) in a first rotational direction (represented by arrows 62). Any skew between the axes of rollers 40 and 42 and rotary drum 18 creates thrust loads on one or more of bearing assemblies 50a, 50b, 54a, and 54b, which in turn causes the respective bearing assemblies for the given rollers to tilt. For example, as shown in FIG. 3, the rotation of rotary drum 18 in the first rotational direction applies thrust loads in a first axial direction (represented by arrow 64) on bearing assemblies 50a, 50b, 54a, and 54b. The applied thrust loads in the first axial direction cause bearing assemblies 50a, 50b, 54a, and 54b to tilt in a first tilt direction (represented by arrow 66). The magnitude of the tilt in the first tilt direction may be a function of a variety of parameters, such as style of bearings, stiffness of the bearing housings, stability of base 55, stability of piers 20, stability of the ground conditions, speed of rotation, and the weight of rotary drum 18. As discussed above, the induced thrust loads can lead to severe surface wear of the faces in rolling contact and can create enough axial force to cause bearing failure.

Sensors 58a, 58b, 60a, and 60b respectively detect the amounts that bearing assemblies 50a, 50b, 54a, and 54b tilt due to the thrust loads applied in the first axial direction along arrow 64. The detected signals relating to the tilt amounts are then transmitted to computer system 14 via communication lines 16, which allows computer system 14 to continuously monitor and log the thrust loads applied to bearing assemblies 50a, 50b, 54a, and 54b while rotary drum 18 rotates in the first rotational direction. After a suitable duration of monitoring to ascertain the tilt amounts for one or more bearing assemblies of rotary kiln 12 (e.g., bearing assemblies 50a, 50b, 54a, and 54b), motor 36 may reverse the rotation of rotary drum 18 to allow monitoring system 10 to ascertain the tilt amounts while rotary drum 18 rotates in the opposing rotational direction.

As shown in FIG. 4, motor 36 rotates rotary drum 18 in a second rotational direction (represented by arrows 68), which is the opposing rotational direction to the first rotational direction discussed above. The skew between the axes of rollers 40 and 42 and rotary drum 18 create thrust loads on bearing assemblies 50a, 50b, 54a, and 54b in a second axial direction (represented by arrow 70), which is substantially opposite of the first axial direction. The applied thrust load in the second axial direction causes bearing assemblies 50a, 50b, 54a, and 54b to tilt in a second tilt direction (represented by arrow 72). The magnitude of the tilt in the second tilt direction may also be a function of a variety of parameters, such as those discussed above for the first tilt direction.

Sensors 58a, 58b, 60a, and 60b respectively detect the amounts that assemblies 50a, 50b, 54a, and 54b tilt due to the thrust loads applied in the second axial direction along arrow 70. The detected tilt amounts are then transmitted to computer system 14 via communication lines 16, thereby allowing computer system 14 to continuously monitor and log the thrust loads applied to bearing assemblies 50a, 50b, 54a, and 54b while rotary drum 18 rotates in the second rotational direction. Based on the monitored tilt amounts, the alignments of one or more of the bearing assemblies of kiln 12 (e.g., bearing assemblies 50a, 50b, 54a, and 54b) may then be adjusted (represented by arrows 73 in FIG. 4) to reduce or substantially eliminate roller skew for each roller of roller mechanisms 22 (e.g., rollers 40 and 42) (i.e., optimize roller skew).

Figure 5:
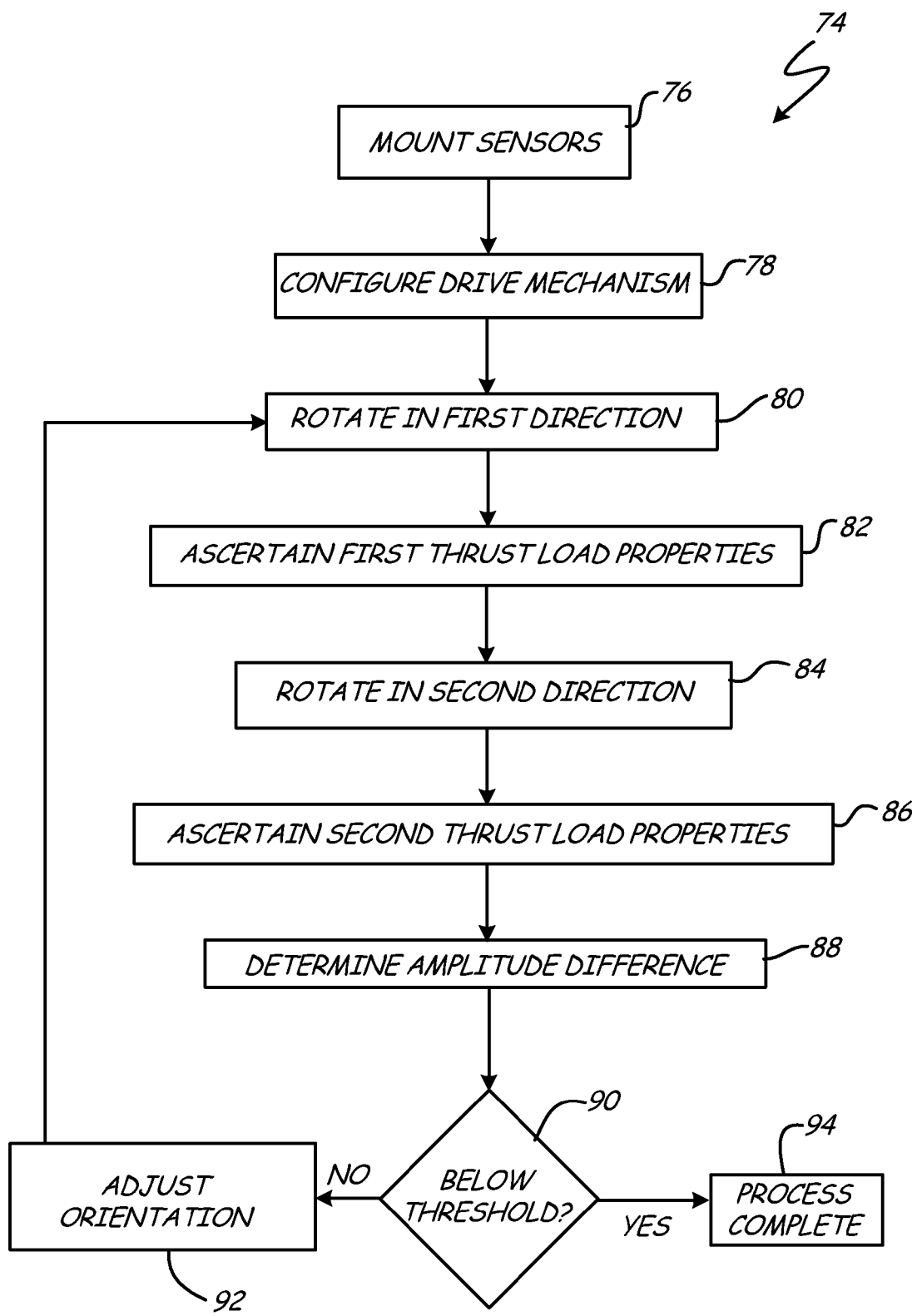
FIG. 5 is a flow diagram of a method for reducing roller skew for a roller configured to support a rotary body.

FIG. 5 is a flow diagram of method 74, which is an exemplary method for reducing roller skew for a roller configured to support a rotary body (e.g., rollers 40 and 42 of kiln 12). As shown, method 74 includes steps 76-94, and initially involves mounting sensors to one or more components that are subjected to the thrust loads applied by the rotation of the rotary body (step 76). For example, sensors 58a, 58b, 60a, and 60b may be secured to one or more locations of bearing assemblies 50a, 50b, 54a, and 54b, thereby allowing sensors 58a, 58b, 60a, and 60b to monitor the amount that each of bearing assemblies 50a, 50b, 54a, and 54b tilt due to the applied thrust loads from rotary drum 18.

For systems that do not incorporate motors that allow the rotary body to rotate in opposing rotational directions, the motor for the rotary body may be configured to rotate the rotary body in the opposing rotations (step 78). For example, the leads on an electrical motor of the rotary body (e.g., motor 36) may be inverted to allow the opposing rotation. Alternatively, auxiliary drive motors may be engaged with the rotary body to provide for the opposing rotations. For example, a variable-frequency drive or a hydraulic motor may be connected to the rotary body.

The rotary body may then be rotated in a first rotational direction (step 80), and a monitoring system may ascertain first thrust load properties based on the thrust loads that the rotary body applies to one or more of the bearing assemblies in a first axial direction (step 82). For example, rotary drum 18 may be rotated in the direction of arrows 62, which applies thrust loads on bearing assemblies 50a, 50b, 54a, and 54b in the direction of arrow 64. Correspondingly, monitoring system 10 may monitor and log the tilt amounts for one or more of bearing assemblies 50a, 50b, 54a, and 54b due to the applied thrust loads. The rotary body is desirably allowed to rotate for a suitable duration (e.g., 5-10 minutes) to allow rolling surfaces to settle in and thrust force to accumulate wherein the bearing and base assembly act much like a spring slowly storing more and more energy before monitoring the desired thrust load properties. In one embodiment, the thrust load properties that are ascertained are averages of multiple measurements (e.g., over 30-second intervals). This embodiment is beneficial to compensate for tyre wobble, which may otherwise interfere with the data analysis.

When a sufficient amount of data of the thrust load properties are ascertained, the rotation of the rotary body is reversed such that the rotary body rotates in a second rotational direction that is opposite of the first rotational direction (step 84). The rotary body is desirably allowed to rotate for a suitable duration (e.g., 5-10 minutes) to allow rolling surfaces to settle in and associated energy accumulation, and a monitoring system may ascertain second thrust load properties based on the thrust loads that the rotary body applies to one or more of the bearing assemblies in a second axial direction (step 86). For example, rotary drum 18 may be rotated in the direction of arrows 68, thereby applying thrust loads on bearing assemblies 50a, 50b, 54a, and 54b in the direction of arrow 70. Correspondingly, monitoring system 10 may monitor and log the tilt amounts for one or more of bearing assemblies 50a, 50b, 54a, and 54b due to the applied thrust loads and energy stored.

Because the second rotational direction is opposite of the first rotational direction, the amplitudes of the ascertained first and second thrust load properties are typically opposite because they are in substantially opposing directions (e.g., the directions of arrows 66 and 72). The difference between the amplitudes is then determined (step 88), which may be performed manually or in an automated manner with a computer system (e.g., computer system 14). Because the amplitudes of the thrust load properties are being compared, the rotation of the rotary body in steps 80 and 84 of method 74 are desirably performed at substantially the same rotational rates to obtain amplitudes that may be evenly compared.

The amplitude difference may then be compared to a predetermined threshold to determine whether the thrust load properties in the opposing rotational directions remain substantially unchanged (step 90). The threshold that the amplitude difference is compared to may vary depending on the operating conditions and the properties of the thrust loads being monitored. In embodiments in which the tilt of the bearing assemblies are being monitored, suitable thresholds for the amplitude difference include tilt differences of about 0.010 degrees or less, with particularly suitable thresholds including tilt differences of about 0.005 degrees or less. If the roller for the rotary body is oriented in a substantially neutral skew position, where the rotational axis of the roller is substantially parallel to the axis of the tyres and the rotary body, then the amplitude difference between the first and second thrust load properties will be substantially zero. Thus, the amplitude difference will be less than the threshold, and the roller does not require any adjustment (step 94).

If, pursuant to step 90 of method 74, the amplitude difference is not less than the threshold, the orientations of one or more of the bearing assemblies may be adjusted to reduce the amplitude difference (step 92). For examples, one or more of bearing assemblies 50a, 50b, 54a, and 54b may be adjusted with the use of adjustment screws 56a, 56b, 57a, and 57b along arrows 73. One or more of steps 80-92 may then be repeated as necessary until the amplitude difference between the first thrust load properties and the second thrust load properties are less than the threshold, pursuant to step 90. Once the amplitude difference is less than the threshold, the roller is oriented in a substantially neutral skew position, and does not require any further adjustment, as discussed above (step 94). Method 74 may then be repeated for each roller mechanism 22 of kiln 12 until each roller is oriented in a substantially neutral skew position such that the rotational axis of each roller is substantially parallel to the rotational axis of the tyres (e.g., along longitudinal axis 30).

Figure 6A:
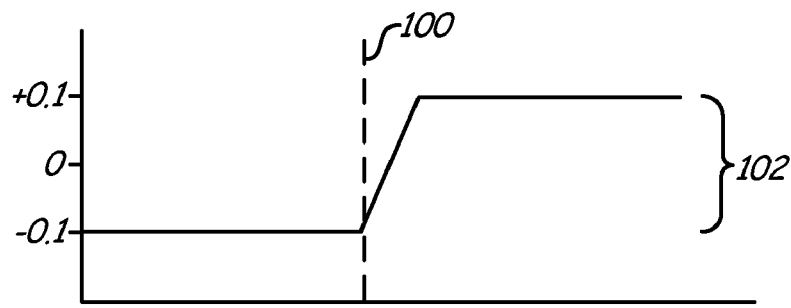
FIGS. 6A-6C are graphical illustrations of tilt angles versus time, which illustrate the application of the method for reducing roller skew.
Figure 6B:
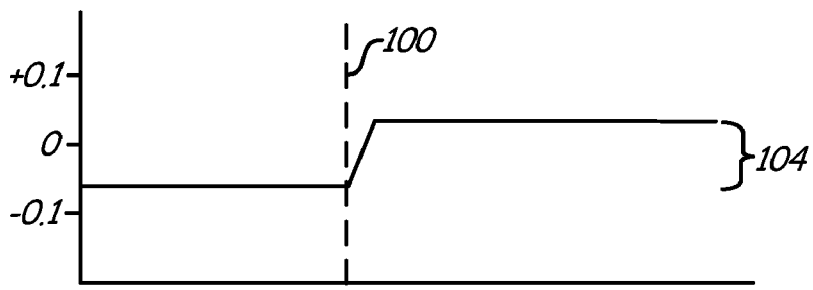
Figure 6C:
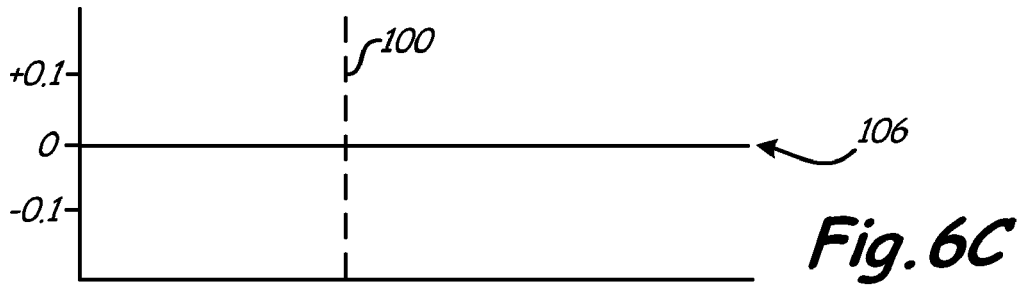

FIGS. 6A-6C are simplified graphical illustrations of tilt versus time for bearing assembly 50a, which illustrate the use of method 74 to reduce roller skew. The plots of the graphical illustrations in FIGS. 6A-6C may be displayed on a viewing screen of computer system 14 based on signals received from sensor 58a via communication lines 16. As such, computer system 14 may also display similar plots for each sensor secured to a bearing assembly along kiln 12 (e.g., sensors 58a, 58b, 60a, and 60b for each roller mechanism 22).

Accordingly, pursuant to steps 80 and 82 of method 74, rotary drum 18 is initially rotated in the first rotational direction, and sensor 58a detects tilt values of about −0.1 degrees, where the negative value of the detected tilt represents the direction of the thrust load applied to bearing assembly 50a. In this example, the first rotational direction causes a thrust load to be applied to bearing assembly 50a in the direction of arrow 64 (shown in FIG. 3), and the detected tilt of −0.1 degrees is represented by arrow 66 (shown in FIG. 3). These initial tilt values are then plotted on computer system 14 for a sufficient duration to allow rolling surfaces to settle in and associated energy accumulation to ensure that the tilt values remain substantially consistent over time.

At transition point 100, pursuant to steps 84 and 86 of method 74, the rotational direction of rotary drum 18 is reversed to the second rotational direction, and sensor 58a detects tilt values of about +0.1 degrees, where the positive value of the detected tilt also represents the direction of the thrust load applied to bearing assembly 50a. In this example, the second rotational direction causes a thrust load to be applied to bearing assembly 50a in the direction of arrow 70 (shown in FIG. 4), and the detected tilt of +0.1 degrees is represented by arrow 72 (shown in FIG. 4). These tilt values are then plotted on computer system 14 for a sufficient duration to allow rolling surfaces to settle in and associated energy to accumulate, to ensure that the tilt values remain substantially consistent over time.

Pursuant to step 88 of method 74, the amplitude difference of the tilt values is then determined (e.g., computed or otherwise calculated). The amplitude difference is desirably based on average tilt values while the given tilt values remain consistent over time. As shown in FIG. 6A, the amplitude difference (referred to as amplitude difference 102) is about 0.2 degrees. Pursuant to step 90 of method 74, amplitude difference 102 is then compared to a threshold, which, in this example is assumed to be 0.01 degrees. Thus, because amplitude difference 102 is greater than the threshold, the orientation of bearing assembly 50a may be adjusted with the use of adjustment screw 56a, pursuant to step 92 of method 74.

As shown in FIG. 6B, the adjustment to the orientation of bearing assembly 50a reduces the skew of roller 40. Accordingly, pursuant to steps 80-86 of method 74, when monitoring the tilt values of bearing assembly 50a while rotating rotary drum 14 in each of the opposing directions, the amplitudes of the tilt values are reduced. This is due the greater alignment between the rotational axis of roller 40 and the rotational axis of rotary drum 18 (i.e., longitudinal axis 30). Accordingly, the amplitude difference of the resulting tilt values (referred to as amplitude difference 104), which is determined pursuant to step 88 of method 74, is also reduced to 0.1 degrees. Pursuant to step 90 of method 74, amplitude difference 104 is then compared to the threshold of 0.01 degrees. Because amplitude difference 102 is greater than the threshold, the orientation of bearing assembly 50a may be further adjusted with the use of adjustment screw 56a, pursuant to step 92 of method 74.

As shown in FIG. 6C, the adjustment to the orientation of bearing assembly 50a further reduces the skew of roller 40. Accordingly, pursuant to steps 80-86 of method 74, when monitoring the tilt values of bearing assembly 50a while rotating rotary drum 14 in each of the opposing directions, the amplitudes of the tilt values are further reduced such that the amplitude difference (referred to as amplitude difference 106) is less than 0.01 degrees. Thus, pursuant to step 90 of method 74, because amplitude threshold 106 is less than the threshold, bearing assembly 50a is properly aligned to substantially eliminate the skew of roller 40. Method 74 may then be performed for each bearing assembly of kiln 12 until each bearing assembly is properly oriented.

The example shown in FIGS. 6A-6C illustrate a simplified example for reducing roller skew by monitoring and adjusting the orientation for a single bearing assembly. In additional embodiments, multiple operations of method 74 may be performed in parallel to adjust multiple bearing assemblies for a single roller, for multiple rollers of a single roller mechanism, and/or for multiple roller mechanisms. Furthermore, the orientations of one or more bearing assemblies may be readjusted to compensate for adjustments made for other bearing assemblies.

The comparison of the relative amplitudes of the first and second thrust load properties allows the skew of the rollers (e.g., rollers 40 and 42) to be reduced or substantially eliminated without requiring a zero-based calibration. For example, previous thrust load measurement techniques require a zero-thrust load baseline, where the rotary body is required to be lifted off of the rollers. This requires substantial effort and time, particularly for large rotary kilns, which can weight several hundred tons. In comparison, method 74 compares relative amplitudes while rotating the rotary body in opposing rotational directions. In fact, in some situations, the location at which the amplitude difference falls below the threshold may not be at a zero-degree tilt depending on the orientations of the bearing assemblies. However, even in these situations, the rollers may attain substantially neutral skew positions relative to the rotational axis of the rotary body. When the roller skew is substantially eliminated, the alignment of the rollers may be maintained for substantial durations (e.g., longer than several months or years) without requiring realignment. This increases operational efficiencies and extends the operational lives of the rollers and bearing assemblies.

Although the discussion herein and illustrations depict a rotary kiln (i.e., kiln 12), the present disclosure is also applicable to any rotary body supported on trunnion rollers. Such rotary bodies may include, for example, rotary kilns, rotary coolers, rotary dryers, rotary furnaces, rotating reactors, rotary filters, bean conditioners, rotary ash cylinders, mill shell bearing surfaces, delacquerers, washers, debarking drums, pelletizers, coal breakers, granulators, incinerators, shakeout drums, and combinations thereof. The method can also be applied to any machine rigidly mounted on a foundation consisting of a bearing supported rotating shaft where an axial shaft load needs to be monitored.

FIG. 7 illustrates monitoring system 110 in use with kiln 112, where monitoring system 110 is an alternative to monitoring system 10 (shown in FIGS. 1-4) for monitoring thrust load properties of kiln 112, and for reducing roller skew in an automated manner. Monitoring system 110 and kiln 112 operate in a similar manner to monitoring system 10 and kiln 12, where the respective reference labels are increased by "100". Thus, computer system 114 monitors thrust load properties that rotary drum 118 applies to roller mechanisms 122 via communication lines 116. Furthermore, monitoring system 110 also includes communication line 208, which is a physical and/or wireless signal line that interconnects computer system 114 and motor 136. This allows computer system 114 to control the rotation of rotary drum 118 in an automated manner. In one embodiment, communication line 116 (or an additional communication line) may also interconnect computer system 114 with control mechanisms (not shown) that are configured to perform an automated function. For example, the control mechanisms may be configured to actuate the adjustment screws (e.g., adjustment screws 156a, 156b, 157a, and 157b). This allows computer system 114 to also adjust the orientations of one or more of bearing assemblies 150a, 150b, 154a, and 154b in an automated manner. Alternatively, the control mechanisms may be configured to initiate an application of a lubricant onto the bearing surfaces for roller mechanisms 122. This embodiment is beneficial for reducing or eliminating the thrust loads, which provides personnel a suitable time period to respond to the situation, and is particularly beneficial while operating kiln 112 during off-hours (e.g., nights and weekends) when emergency personnel may not be immediately available.

Accordingly, computer system 114 may ascertain the thrust load properties applied to the components of roller mechanisms 122 (e.g., bearing assemblies 150a, 150b, 154a, and 154b) to monitor roller skew in real time. Thus, computer system 114 may perform method 74 in an automated manner to continuously maintain proper roller alignments relative to the rotational axis of rotary drum 118. This further increases operational efficiencies, and further extends the operational lives of the rollers and bearing assemblies.

FIG. 8 illustrates monitoring system 210 in use with kiln 212, where monitoring system 210 is an alternative to monitoring system 10 (shown in FIGS. 1-4) and monitoring system 110 (shown in FIG. 7) for monitoring thrust load properties of kiln 212 with thrust rollers. Monitoring system 210 and kiln 212 operate in a similar manner to monitoring system 10 and kiln 12, where the respective reference labels are increased by "200". In the embodiment shown in FIG. 8, kiln 212 includes thrust roller mechanism 296 that engage with tyre 228. In alternative embodiments, kiln 212 may include a plurality of thrust roller mechanisms 296 for engagement with multiple tyres 228. As shown, thrust roller mechanism 296 includes a pair of thrust rollers bearing against the downstream or upstream sides of tyre 28. The thrust rollers are beneficial for preventing rotary drum 18 from slipping off of roller mechanisms 22 during operation. In this embodiment, the sensors (e.g., corresponding to sensors 58a, 58b, 60a, and 60b) may be secured to one or more thrust roller mechanisms 296 for detecting the thrust load properties (e.g., the magnitude of pressures) applied to the one or more thrust rollers. Thus, computer system 214 may monitor the thrust load properties that rotary drum 218 applies to the one or more thrust roller mechanisms 296 via communication lines 216 in the same manner as discussed above for monitoring systems 10 and 110.

Although the present system and method for reducing roller skew has been described with reference to preferred embodiments, workers skilled in the art will recognize that changes may be made in form and detail without departing from the spirit and scope of this disclosure.

The invention claimed is:

1. A method for reducing roller skew for a plurality of rollers configured to support a rotary body, the method comprising:

ascertaining a first thrust load property applied to a first roller of the plurality of rollers from the rotary body while the rotary body rotates in a first rotational direction;

ascertaining a second thrust load property applied to the first roller from the rotary body while the rotary body rotates in a second rotational direction that is opposite of the first rotational direction; and adjusting an orientation of at least one bearing assembly for the first roller until an amplitude difference between the first thrust load property and the second thrust load property is below a predetermined threshold.

2. The method of claim 1, wherein adjusting the orientation of the at least one bearing assembly is at least partially performed in real time while ascertaining at least one of the first thrust load property and the second thrust load property.

3. The method of claim 1, and further comprising switching the rotation of the rotary body from the first rotational direction to the second rotational direction with a mechanism selected from the group consisting of a variable-frequency electric motors, hydraulic motors, electric motors containing reversing switches, motors containing reversible leads, and combinations thereof.

4. The method of claim 1, wherein the at least one bearing assembly for the first roller comprises a plurality of bearing assemblies for the first roller, and wherein adjusting the orientation of the at least one bearing assembly comprises adjusting orientations of each of the plurality of bearing assemblies.

5. The method of claim 1, and further comprising:

ascertaining a third thrust load property applied to a second roller of the plurality of rollers from the rotary body while the rotary body rotates in the first rotational direction;

ascertaining a fourth thrust load property applied to the second roller from the rotary body while the rotary body rotates in the second rotational direction; and adjusting an orientation of at least one bearing assembly for the second roller until an amplitude difference between the third thrust load property and the fourth thrust load property is below a predetermined threshold.

6. The method of claim 1, wherein the rotary body comprises a rotary kiln.

7. The method of claim 1, wherein ascertaining the first thrust load property comprises measuring a first tilt angle of the first roller while the rotary body rotates in the first rotational direction, and wherein ascertaining the second thrust load property comprises measuring a second tilt angle of the first roller while the rotary body rotates in the second rotational direction.

8. A method for reducing roller skew for a plurality of rollers configured to support a rotary body, the method comprising:

(a) rotating a rotary body in a first rotational direction, which places a first thrust load on a first roller of the plurality of rollers;

(b) switching the rotational direction of the rotary body from the first rotational direction to a second rotational direction that is opposite of the first rotational direction, which places a second thrust load on the first roller;

(c) adjusting an orientation of at least one bearing assembly for the first roller to reduce a difference in amplitude between the first thrust load and the second thrust load; and (d) repeating step (a), step (b), step (c), or combinations thereof until the difference in the amplitude is below a predetermined threshold.

9. The method of claim 8, and further comprising:

measuring a first tilt angle of the first roller while the rotary body rotates in the first rotational direction, wherein the first tilt angle correlates to the first thrust load; and measuring a second tilt angle of the first roller while the rotary body rotates in the second rotational direction, wherein the second tilt angle correlates to the second thrust load, and wherein the second tilt angle is in an axially opposite direction from the first tilt angle.

10. The method of claim 8, wherein the at least one bearing assembly for the first roller comprises a plurality of bearing assemblies for the first roller, and wherein adjusting the orientation of the at least one bearing assembly comprises adjusting orientations of each of the plurality of bearing assemblies.

11. The method of claim 8, wherein the rotary body further places a third thrust load on a second roller of the plurality of rollers while rotating in the first rotational direction, wherein the rotary body further places a fourth thrust load on the second roller while rotating in the second rotational direction, and wherein the method further comprises adjusting an orientation of at least one bearing assembly for the second roller to reduce a difference in amplitude between the third thrust load and the fourth thrust load.

12. The method of claim 8, wherein switching the rotation of the rotary body from the first rotational direction to the second rotational direction comprises adjusting a frequency of electrical power supplied to a motor configured to rotate the rotary body.

13. The method of claim 8, wherein the rotary body comprises a rotary kiln.

14. A system for reducing roller skew for a plurality of rollers configured to support a rotary body, the assembly comprising:

at least one sensor securable to a bearing assembly of a first roller of the plurality of rollers, the at least one sensor being configured to measure a property corresponding to a thrust load applied to the first roller from the rotary body; and a computer-based system in signal communication with the at least one sensor, and configured to monitor the property measured by the at least one sensor while the rotary body rotates in a first rotational direction and in a second rotational direction that is opposite of the first rotational direction.

15. The system of claim 14, and further comprising a variable frequency drive configured to adjust a frequency of electrical power supplied to a motor that rotates the rotary body to rotate the rotary body in the first rotational direction and in the second rotational direction.

16. The system of claim 15, wherein the computer-based system is also in signal communication with the variable frequency drive to direct the variable frequency drive to adjust the frequencies of electrical power supplied to the motor.

17. The system of claim 14, wherein the at least one sensor comprises a tilt meter, and wherein the property measured comprises a tilt angle of the first roller.

18. The system of claim 14, and further comprising a plurality of sensors securable to bearing assemblies of the plurality of rollers, wherein the computer-based system is in signal communication with each of the plurality of sensors, and is further configured to monitor properties measured by each of the plurality of sensors while the rotary body rotates in the first axial direction and in the second axial direction.

19. The system of claim 14, wherein the computer-based system is further configured to determine differences in amplitudes between the properties measured by the at least one sensor while the rotary body rotates in the first rotational direction and the properties measured by the at least one sensor while the rotary body rotates in the second rotational direction.

20. The system of claim 14, wherein the rotary body comprises a rotary kiln.

* * * * *